Feb. 23, 1932.  E. ROTH  1,847,040

PROCESS OF TRANSFORMING A UNIFORM ROTARY MOTION

Filed Feb. 9, 1929

Inventor:
Erich Roth.

Patented Feb. 23, 1932

1,847,040

UNITED STATES PATENT OFFICE

ERICH ROTH, OF DRESDEN, GERMANY

PROCESS OF TRANSFORMING A UNIFORM ROTARY MOTION

Application filed February 9, 1929, Serial No. 338,834, and in Germany February 27, 1928.

The present invention relates to a process of transforming a uniform rotary motion into one variable without graduation as to speed and direction, the process being applied with particular advantage to all kinds of circulating gears.

According to the invention, a uniform rotary motion is transformed into a rotary motion, the speed of which can be varied without graduation from a maximum in one direction over zero to a maximum in the opposite direction.

The invention consists in dividing the rotary motion to be transformed into a uniform rolling motion and into a rotary motion the speed of which may be varied at will so that the sum of the vectors of both partial motions becomes positive, zero or negative and thus produces rotary motion in the desired direction and at the desired speed. The process can be applied to the construction of mechanical variable speed and reversing gears by employing toothed or plain cylindrical revolving units for the transmission of motion and by relieving the bearings of the latter from pressure.

Figure 1:
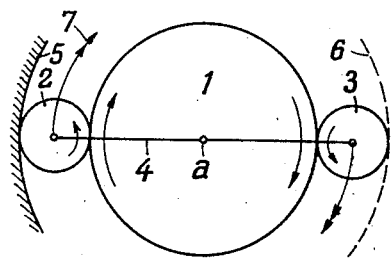
Figure 2:
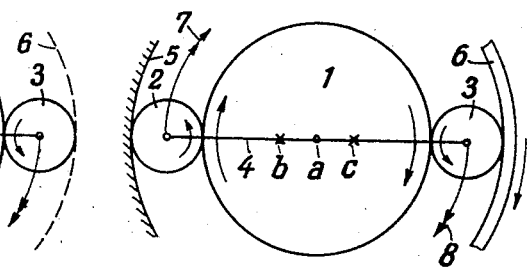
Figure 3:
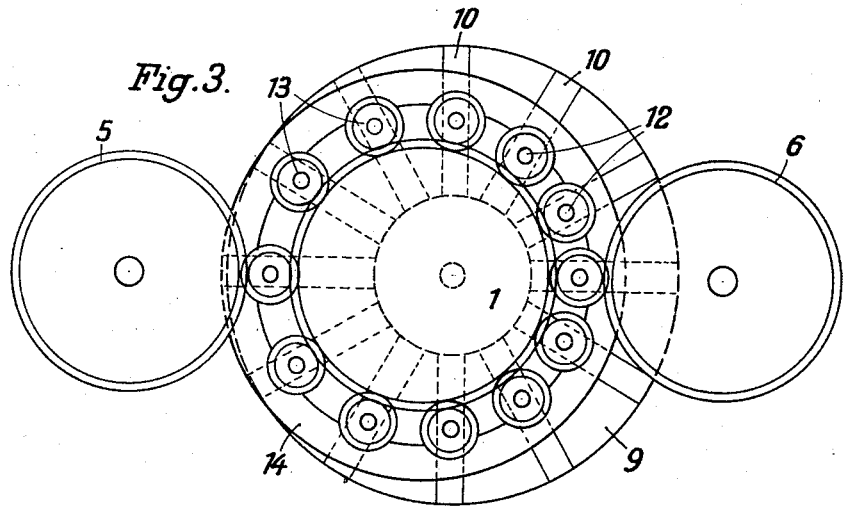
Figure 4:
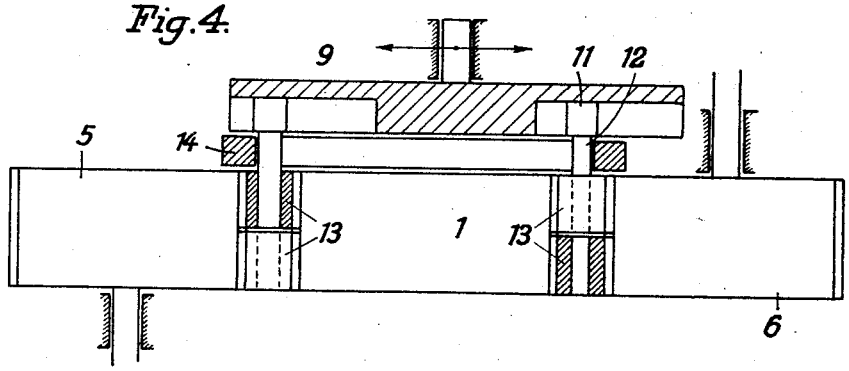

One form of the invention is illustrated in the accompanying drawings, in which Figures 1 and 2 are a diagrammatic view of the process, and Figs. 3 and 4, a front view and a cross section, respectively, showing the process applied to a gear.

Referring to the drawings, 1 is a cylinder executing a uniform rotary motion and transmitting it to its two adjacent rollers 2 and 3 arranged on the ends of a lever 4, the fulcrum $a$ of which (Fig. 1) coincides with that of the cylinder 1. If a fixed hollow cylinder surface 5 is pressed against the roller 2 from the outside, the rotary motion of the latter will change to a rolling one, and the roller will roll about the cylinder 1 in the direction of the arrow 7. By means of the lever 4 this motion is imparted also to the roller 3 which, along the dotted circular line 6, executes exactly the same rolling motion as the roller 2 on the rolling surface 5. A surface 6 held against the roller 3 on this line would therefore not receive any motion from the latter.
If the fulcrum of the lever 4 is moved from its central position $a$ to $b$ (Fig. 2), the speed of the rotary motion of the roller 3 is increased so that it rolls forward now on the cylinder 1 in the direction of the arrow 8 and transmits at the outer circumference of its orbit its motion to the hollow cylinder surface 6 which is thus caused to move in the same direction, the speed of this motion increasing the farther point $b$ is distant from point $a$. The speed drops to zero again, if the fulcrum of the lever 4 returns to $a$, and increases again in the opposite direction of rotation, when the fulcrum moves from $a$ to $c$. In the latter case, the roller 3 revolves more slowly than corresponds to the circumferential speed of the cylinder 1. It therefore rolls back on the cylinder 1 opposite to the latter's direction of rotation and transmits this counter movement to the surface 6.

In the practical application of the process, as shown, for example, in Figs. 3 and 4, the two rollers 2 and 3 must be replaced by several rollers or pinions of the same kind surrounding the central wheel 1 in a coroniform manner. The lever 4 is replaced by a disc wheel 9 possessing the radial slot guides 10 wherein the sliding blocks 11 are movably arranged which carry the pinions 13 on the axle bolts 12. The disc wheel 9 is arranged rotatably; its axis is on a plane with those of the wheels 5 and 6 and adapted to be shifted thereon. All bolts are held in circular position by means of a common guide ring 14, and the rollers rotatably arranged on the bolts rotate about the circumference of the center wheel 1. If the axis of the disc wheel 9 coincides with that of the center wheel 1, the pinions will be distributed uniformly over the circumference of the center wheel 1. If the disc wheel 9 is shifted towards one side, the pinions will crowd together on this side and move away from one another on the other side (Fig. 3).

If the center wheel 1 is turned while the disc wheel 9 is in center position, the pinion in mesh with the fixed wheel 5 will rotate on the latter for a certain distance until it is out of engagement with the wheel. In the meantime, however, the next pinion has been brought into mesh with the external wheel 5, and the motion of the center wheel is continually transmitted over the pinions and their axle bolts to the disc wheel 9 which thus revolves at half the number of revolutions of the center wheel in the same direction. The external wheel 6 is at first not set in motion by the circle of pinions 13 rolling past it and coming successively into engagement with it. Only when the disc wheel 9 is shifted from its center position will the pinions transmit their motion to the wheel 6 in one or the other direction.

To prevent interruption in transmission, the center wheel is provided with two or more circles of pinions arranged in staggered relation to one another so that at any position of the disc wheel 9 at least two pinions 13 are in mesh with the external wheels 5 and 6. This arrangement insures further never failing meshing of the pinions and external wheels, as the position of the teeth is continually and positively maintained by the meshing pinions.

The gear may be used differently, too; for example, the center wheel 1 can be fixed and the wheel 5 driven.

Or, if the center wheel 1 is driven, the external wheel 6 may have teeth while the fixed wheel 5 can be provided with a segment only.

If the gear is constructed in this manner, that is with plain cylindrical rotary units instead of with toothed wheels, all bearings can be relieved completely by providing two gears of equal type and by arranging them so that the two external wheels 6 press against one another.

The process described permits the construction of mechanical variable speed and reversing gears of all kinds capable of variable gearing without graduation. The motion may be transformed by means of toothed wheels or cylindrical rotary units adapted to roll over one another without the least sliding friction, while the bearings of such rotary units may be relieved completely from the pressure required for transmission.

I claim:—

1. In a gear for transforming a uniform rotary motion into one variable as to speed and direction without graduation, the combination with a planet-like gearing having a cylindrical rotary body and two oppositely arranged rollers lying adjacent thereto with their axis in the same plane as the axis of the cylindrical rotary body, of means driven by said rollers, a fulcrumed carrier for altering the rotation speed of said rollers, the fulcrum of which lies and is movable also in the aforementioned plane, and means for transforming the rotation of the rollers into a rolling movement on the means to be driven by said rollers.

2. In a gear for transforming a uniform rotary motion into one variable as to speed and direction without graduation, the combination with a planet-like gearing having a cylindrical rotary body and two oppositely arranged rollers lying adjacent thereto with their axis in the same plane as the axis of the cylindrical rotary body, of means driven by said rollers, a fulcrumed carrier for altering the rotation speed of said rollers, the fulcrum of which lies and is movable also in the aforementioned plane, and a fixed path for the oppositely arranged rollers, against which path the roller on the one side of the rotary body is pressed, whereas the roller on the other side of the rotary body is in contact with the means driven by said roller.

3. In a gear for transforming a uniform rotary motion into one variable as to speed and direction without graduation, the combination with a planet-like gearing having a cylindrical rotary body and a number of rollers arranged around said rotary body and adjacent thereto, of means diven by said rollers, a fulcrumed carrier for altering the rotation speed of said rollers, the fulcrum of which lies and is movable also in the aforementioned plane, and a fixed path for the rollers around the cylindrical rotary body, against which path said rollers on the one side of the rotary body are pressed whereas the rollers on the other side of the rotary body are in contact with the means driven by said rollers.

4. In a gear for transforming a uniform rotary motion into one variable as to speed and direction without graduation, the combination with a rotary center tooth-wheel, of a rotatable and shiftable disk-wheel, radial guide slots in said wheels, a plurality of rollers slidably and rotatably arranged in the said slots and adapted to rotate on the circumference of the said center tooth-wheel, an annular guide in which the said rollers circulate, a driving and a driven gear-wheel on opposite sides of the center tooth-wheel coacting with the rollers, the distance of the rollers from the turning axle of the disk-wheel and thus the circumferential speed of said rollers being varied during their circular path by shifting the disk-wheel in order to vary without graduation the transmission of the rotary motion from the driving gear-wheel to the driven gear-wheel.

In testimony whereof I have affixed my signature.

ERICH ROTH.